United States Patent
Sakamura et al.

(10) Patent No.: US 8,161,499 B2
(45) Date of Patent: Apr. 17, 2012

(54) DATA PROCESSING DEVICE AND DATA PROCESSING METHOD

(75) Inventors: Ken Sakamura, Tokyo (JP); Noboru Koshizuka, Musashino (JP); Masayuki Terada, Yokosuka (JP); Kensaku Mori, Yokohama (JP); Kazuhiko Ishii, Yokohama (JP); Sadayuki Hongo, Yokohama (JP)

(73) Assignees: NTT DoCoMo, Inc., Tokyo (JP); Ken Sakamura, Tokyo (JP); Noburo Koshizuka, Musashino-shi (JP)

( * ) Notice: Subject to any disclaimer, the term of this patent is extended or adjusted under 35 U.S.C. 154(b) by 1167 days.

(21) Appl. No.: 11/587,096

(22) PCT Filed: Apr. 21, 2005

(86) PCT No.: PCT/JP2005/007644
§ 371 (c)(1),
(2), (4) Date: Jan. 30, 2007

(87) PCT Pub. No.: WO2005/103918
PCT Pub. Date: Nov. 3, 2005

(65) Prior Publication Data
US 2009/0158296 A1  Jun. 18, 2009

(30) Foreign Application Priority Data
Apr. 21, 2004  (JP) ................. P2004-126054

(51) Int. Cl.
G06F 3/00 (2006.01)
G06F 9/44 (2006.01)
G06F 12/00 (2006.01)
G06F 13/00 (2006.01)
G06F 13/28 (2006.01)
G06F 9/26 (2006.01)
G06F 15/16 (2006.01)
G06F 15/167 (2006.01)
G06F 15/177 (2006.01)

(52) U.S. Cl. ........ 719/321; 719/327; 711/147; 711/151; 711/154; 711/170; 709/201; 709/212; 709/213

(58) Field of Classification Search .................. None
See application file for complete search history.

(56) References Cited

U.S. PATENT DOCUMENTS
6,226,644 B1 * 5/2001 Ciscon et al. .................. 1/1
(Continued)

FOREIGN PATENT DOCUMENTS
CN  1484139 A  3/2004
(Continued)

OTHER PUBLICATIONS
Digital Certificate Infrastructure, Corporation for Research and Educational Networking, Feb. 1, 2002. pp. 1-6.*
(Continued)

Primary Examiner — Andy Ho
Assistant Examiner — Craig Dorais
(74) Attorney, Agent, or Firm — Oblon, Spivak, McClelland, Maier & Neustadt, L.L.P.

(57) ABSTRACT

A data processing method using a data processing apparatus on a transmitting side having an application for performing processing using an internal device set in the data processing apparatus, a driver that accepts an access request to the internal device from the application, a handler that performs access processing to the internal device and transmitting a message to an external device set outside the data processing apparatus, and a storage device that stores a device ID as a transmission destination for specifying the internal or external device and the handler in association with each other, and a data processing apparatus on a receiving side that receives the message transmitted from the data processing apparatus on the transmitting side.

5 Claims, 6 Drawing Sheets

U.S. PATENT DOCUMENTS

| | | | |
|---|---|---|---|
| 6,314,501 B1 * | 11/2001 | Gulick et al. | 711/153 |
| 6,810,457 B2 * | 10/2004 | Hagiwara | 710/242 |
| 7,032,224 B2 * | 4/2006 | Kadakia et al. | 719/313 |
| 2003/0037180 A1 | 2/2003 | Madineni et al. | |
| 2004/0030415 A1 | 2/2004 | Lee | |
| 2004/0078364 A1 * | 4/2004 | Ripley et al. | 707/3 |
| 2005/0229000 A1 | 10/2005 | Shoji et al. | |

FOREIGN PATENT DOCUMENTS

| | | |
|---|---|---|
| EP | 0 259 659 A2 | 3/1988 |
| JP | 5-257854 | 10/1993 |
| JP | 6-309265 | 11/1994 |
| JP | 07 219786 | 8/1995 |
| JP | 08 030465 | 2/1996 |
| JP | 9-16353 | 1/1997 |
| JP | 10 011384 | 1/1998 |
| JP | 10-240654 | 9/1998 |
| JP | 10-333924 | 12/1998 |
| JP | 2000-222335 | 8/2000 |
| JP | 2002-24154 | 1/2002 |
| JP | 2004-70964 | 3/2004 |
| JP | 2004 070964 | 3/2004 |
| KR | 10-2004-0013703 | 2/2004 |
| WO | WO 03/069492 A1 | 8/2003 |

OTHER PUBLICATIONS

Ted Faison, "Interaction Patterns for Communicating Processes", Pattern Languages of Programs Conference, XP-002160754, Aug. 11, 1998, pp. 1-35.

Chen JN, et al., "Synchronous and Asynchronous Device Driver Modes", IP.COM Journal, IP,COM INC., XP-013049890, Apr. 1, 1986, 2 pages.

Office Action issued Aug. 25, 2011, in European Patent Application No. 05 734 673.6.

* cited by examiner

| TRANSMISSION DESTINATION | HANDLER TO BE INVOKED |
|---|---|
| ID OF APPLICATION | APPLICATION HANDLER 13 |
| ID OF IC MEMORY 16 | IC MEMORY HANDLER 16 |
| ID OF IC MEMORY 16a | COMMUNICATION HANDLER 15 |

Fig.3

| TRANSMISSION DESTINATION | HANDLER TO BE INVOKED |
|---|---|
| ID OF IC MEMORY 16a | IC MEMORY HANDLER 14a |
| ID OF IC MEMORY 16 | COMMUNICATION HANDLER 15a |

DATA PROCESSING DEVICE AND DATA PROCESSING METHOD

TECHNICAL FIELD

The present invention relates to a data processing apparatus and a data processing method that execute an application that can access a device such as IC memory via a driver.

BACKGROUND OF THE INVENTION

When an application running on an apparatus attempts to access an external device such as an IC memory, a driver to an access IC memory can usually be used to access the IC memory. That is, the application outputs an access request to the driver, and then the driver performs specific processing in accordance with the request such as reading/writing data from/to the IC memory and, after the processing is completed, obtains data read from the IC memory or a response to the data writing. When the driver outputs a response result of the processing or data obtained through the processing to the application, the application can obtain a result of the access request to the IC memory.

BRIEF SUMMARY OF THE INVENTION

However, if an application makes an access request to a device such as an IC memory via a driver, the application is forced to remain in a wait state until a result such as a response is received from the driver. After issuing an access request to the IC memory, depending on processing content, the application may perform application's original processing without obtaining an access result from the IC memory, but since the application is already in a wait state, a problem that application's original processing cannot be performed and a processing speed is slowed or the like arises.

Therefore, an object of the present invention is to realize a data processing apparatus and a data processing method that can perform other processing immediately after an application issues an access request to a device via a driver.

To solve the above problem, a data processing apparatus according to the present invention comprises a device for performing predetermined specific processing, an application for performing processing using the device, a handler means for performing access processing to the device, and a driver means for invoking the handler means according to an instruction from the application and notifying to the application the effect that the instruction has been accepted.

In the above configuration of the present invention, the driver means responds to an inquiry from the application and at the same time, by causing the handler means to access the device in response to a request from the application, the driver means can immediately return a response to the application so that the application can perform application processing without waiting for a response of a final processing result in the device. Also, by performing access processing to the device via the handler means simultaneously, the application is not forced to wait until device processing is completed so that the application can realize swift processing without waiting for a response from the driver.

Also, the data processing apparatus according to the present invention may be constructed to further comprise: a plurality of handler means according to processing content; and a storing means for storing information representing a correspondence relationship between a destination to which a message generated by the application or the device is to be transmitted and a handler means, wherein the driver means, when receiving a message generated by the application or the device, invokes the handler means corresponding to the destination, based on a destination described in the message and information of the correspondence relationship stored in the storing means.

Since a plurality of handler means are provided in the above configuration of the present invention, a plurality of processing can be dealt with and an easy-to-use data processing apparatus can be realized.

Also, the data processing apparatus according to the present invention may also be configured to further comprise a communication means for transmitting and receiving the message via a network, wherein a handler means invoked by the driver means transmits a message to a predetermined destination using the communication means.

In a data processing method according to the present invention using a data processing apparatus on a transmitting side having an application for performing processing using a device, a driver means for accepting an access request to the device from the application, and a handler means for performing access processing to the device and transmitting a message, and a data processing apparatus on a receiving side for receiving a message transmitted from the data processing apparatus, the data processing method comprises: a requesting step in which an application makes an access request to the device to the driver means; an invoking step in which the driver means invokes a handler means for performing access processing to the device; a responding step in which the driver means responds to the access request of the application; a selecting step in which the driver means selects a handler means from among a plurality of handler means corresponding to the destination if the driver means obtains a message having the destination and data to be transmitted from the invoked handler means as a result of accessing to the device; a transmitting step in which the selected handler means transmits the message to the destination, or the data processing apparatus on the receiving side; and a transferring step in which the data processing apparatus on the receiving side transfers the received message to a device specified by a destination described in the received message.

In the above configuration of the present invention, by transmitting a message via a network by invoking a handler means corresponding to a destination contained in the message, there is no need particularly for an application to wait for a processing result of processing taking a long time such as processing via a network and thus swift processing of the application can be expected.

Further, the data processing apparatus according to the present invention comprises a shared memory for registering a message attached with a data destination, an application for registering a message in the shared memory and, after registering the message, performing other processing, and a handler means for always monitoring messages registered in the shared memory and, when a message attached with a specific data destination is registered, obtaining the message.

Also, a data processing method according to the present invention comprises: a registration step in which the application for registering a message in shared memory in which a message attached with a data destination is registered; a execution step in which the application, after the registration step, performs specific processing; and a retrieving step in which a handler means for monitoring messages registered in the shared memory, when judging that a message attached with a specific data destination has been registered in the shared memory, performs retrieving processing of the registered message.

In the above configuration of the present invention in which the handler means is provided for registering a message in the shared memory and monitoring messages registered in the shared memory, and when a specific message is registered in the shared memory, the corresponding handler means retrieves the message to perform specific processing to the message and the application is enabled to perform application's original processing after registration processing, the application can realize swift processing without waiting for processing in the device.

In the present invention, a driver means responds to an inquiry from an application and, by causing a handler means to access a device in response to a request from the application, a response can immediately be returned to the application from the driver means so that the application can perform processing without waiting for a final processing result in the device. Also, by performing access processing to the device via the handler means simultaneously, the application is not forced to wait until device processing is completed so that the application can realize swift processing without waiting for a response from the driver.

Also, by configuring the present invention in such a way that the handler means is provided for registering a message in the shared memory and monitoring messages registered in the shared memory and, when a specific message is registered in the shared memory, the corresponding handler means retrieves the message to perform specific processing to the message and the application is enabled to perform application's original processing after registration processing, the application can realize swift processing without waiting for processing in the device.

DESCRIPTION OF THE REFERENCE SYMBOLS

11: application; 12: driver; 13: application handler; 14: IC memory handler; 15: communication handler; 16: IC memory; 17: handler management table; 18: communication part; 19: display part

DETAILED DESCRIPTION OF THE INVENTION

Figure 1:
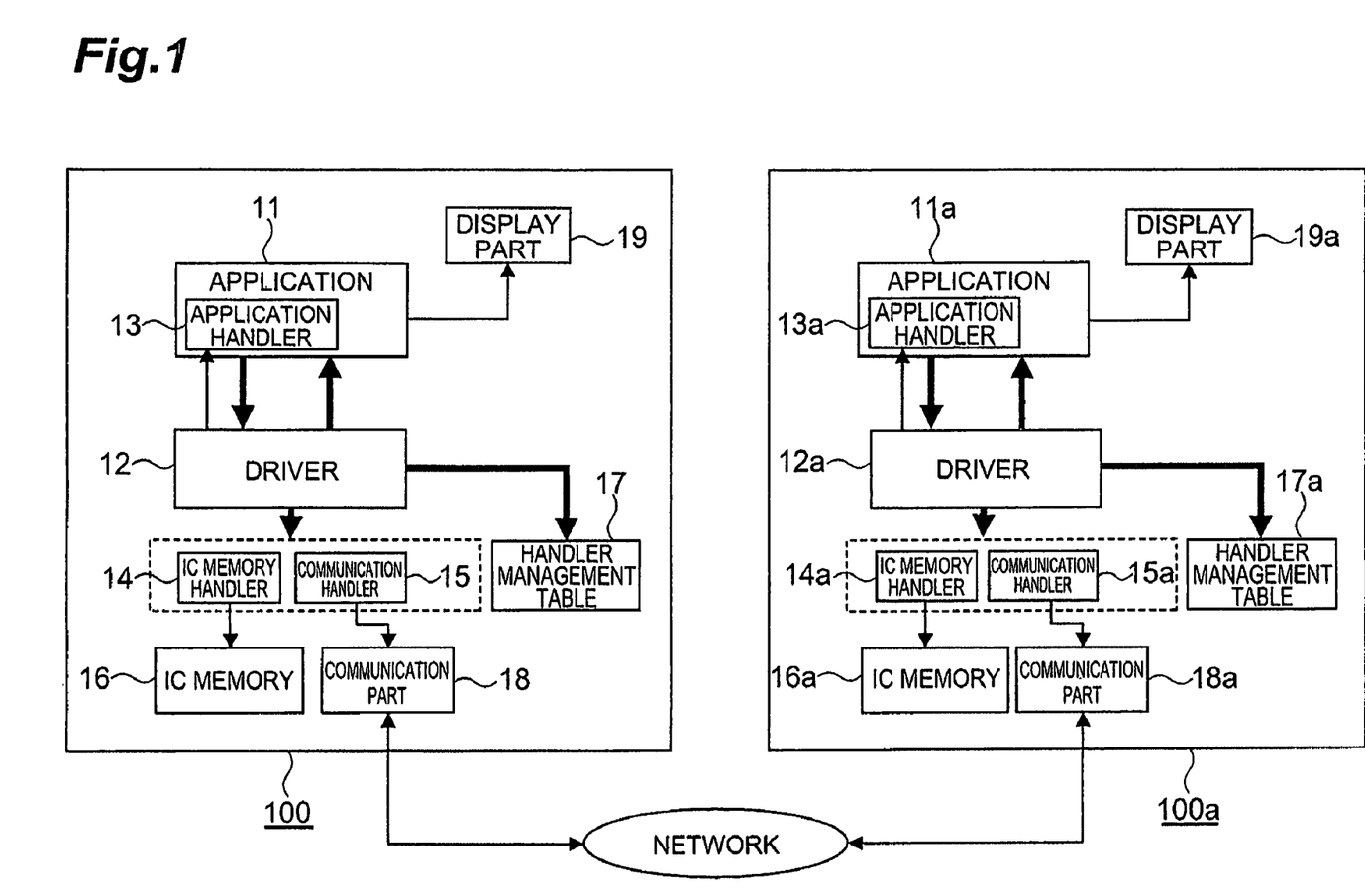
FIG. 1 is a block diagram of data processing apparatuses 100 and 100a in the present invention.

A data processing apparatus and a data processing method according to the present invention will be described with reference to drawings. FIG. 1 is a block diagram of data processing apparatuses in the present invention.

A data processing apparatus 100 according to the present invention is comprised of an application 11 (application of the present invention) (holding an application handler 13 (handler means of the present invention) therein), a driver 12 (driver means of the present invention), an IC memory handler 14 (handler means of the present invention), a communication handler 15 (handler means of the present invention), an IC memory 16 (device of the present invention), a handler management table 17 (storing means of the present invention), a communication part 18 (communicating means of the present invention), and a display part 19. Similarly, a data processing apparatus 100a, which is a communication partner of the present invention, is comprised of an application 11a (holding an application handler 13a inside), a driver 12a, an IC memory handler 14a, a communication handler 15a, an IC memory 16a, a handler management table 17a, a communication part 18a, and a display part 19a.

The application 11 is activated and operated in the data processing apparatus 100 to perform specific processing. In the present example, the application 11 is an application that can verify an electronic signature and has functions to make a request of transmission of a message to which an electronic signature is to be attached to request a communication partner to attach an electronic signature and, along with the request, to demand a public key certificate from a public key authentication server and make an inquiry at a validity verification server about validity of the public key to verify the requested electronic signature based on the above processed information.

The driver 12 has functions to invoke, when accepting a transmission request of a message to which an electronic signature should be attached from the application 11, the IC memory handler 14 to request encryption processing of the message to be transmitted and to return a response of acceptance of the transmission request to the application 11. The driver 12 invokes the communication handler 15 to transmit the encrypted message to an apparatus to attach an electronic signature to the encrypted message, that is, the data processing apparatus 100a. Furthermore, when data to which an electronic signature is attached is received from the data processing apparatus 100a, the driver 12 invokes the IC memory handler 14 to perform decryption processing and, when decrypted data is received, the driver 12 invokes the application handler 13 inside the application 11 to cause the application handler 13 to verify the electronic signature.

Incidentally, a driver in general is software that acts as a go-between when connecting an application and hardware and the driver in the present invention has a function, in addition to being software acting as a go-between when connecting an application and hardware, to invoke a handler for connecting to hardware.

The application handler 13 is a handler held inside the application and, when the handler is invoked, application processing is interrupted to perform specific processing. In the present invention, verification processing of an electronic signature is performed. Here, a handler refers to an interrupt handling routine that is activated by an external interrupt and, in the present embodiment, is a program that is invoked by the driver 12 and performs access processing to a device such as the IC memory 16 or performs interrupt processing to application processing.

The IC memory handler 14 is a handler for accessing the IC memory 16 and transmits data to be encrypted or data to be decrypted to the IC memory 16 when encryption processing or decryption processing of a message needs to be performed in the IC memory 16.

The communication handler 15 is a handler for performing communication processing. The communication handler 15 is invoked by the driver 12 according to a destination written in a message processed and generated by the IC memory 16 and performs transmission processing to the predetermined destination. In the present invention, an IP address of the data processing apparatus 100a as a destination when encryption processing is performed is stored in a memory (not shown) in advance and the IP address is read when transmitting a message. Note that, the communication handler 15 may obtain an IP address by placing a server associating a destination ID with the IP address in a network and transmitting a destination ID to the server.

The IC memory 16 is memory composed of non-volatile memory, and is detachably mounted and mainly used for encryption processing and decryption processing.

Figure 2:
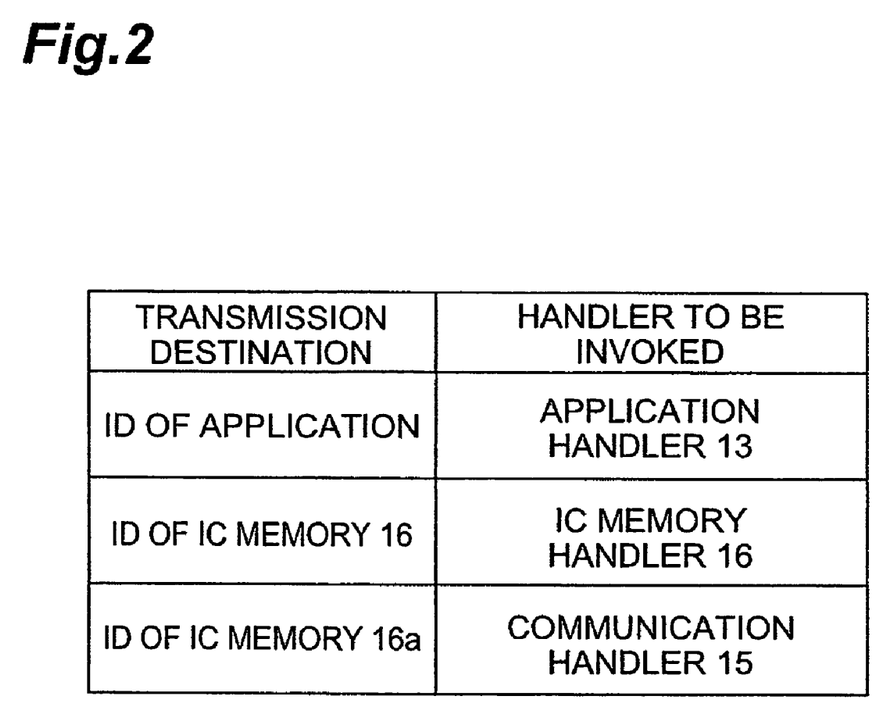
FIG. 2 is an illustration showing a specific example of a management table 17 in the present invention.

The handler management table 17 stores a handler to be invoked corresponding to a destination (destination specifying a device provided in own apparatus or in an external apparatus) written in a message transmitted by the application 11 or each of the above handlers. FIG. 2 is an illustration showing a concrete example of the management table 17.

The handler management table 17 stores a destination specifying a device and a handler to be invoked by associating with each other. When a message composed of three items of <transmission source, transmission destination, data content> is transmitted to the driver 12, the driver 12 judges which handler is to be invoked based on the destination written in the transmitted message and the handler management table 17 and invokes the relevant handler. Besides, a destination is represented by an ID specifying a device and each device (an IC memory, an application and the like) can be specified using the ID.

The communication part 18 conducts communication with a communication partner via a network under control of the communication handler 15.

The display part 19 displays a result of verifying an electronic signature signed with the data processing apparatus 100a.

The data processing apparatus 100a is an apparatus for accepting a request of electronic signature from the data processing apparatus 100.

The IC memory 16a decrypts a message transmitted from the data processing apparatus 100 and attaches an electronic signature to the decrypted message. Then, the IC memory 16a encodes the message attached with the electronic signature and returns the message to the IC memory driver 14.

Figure 3:
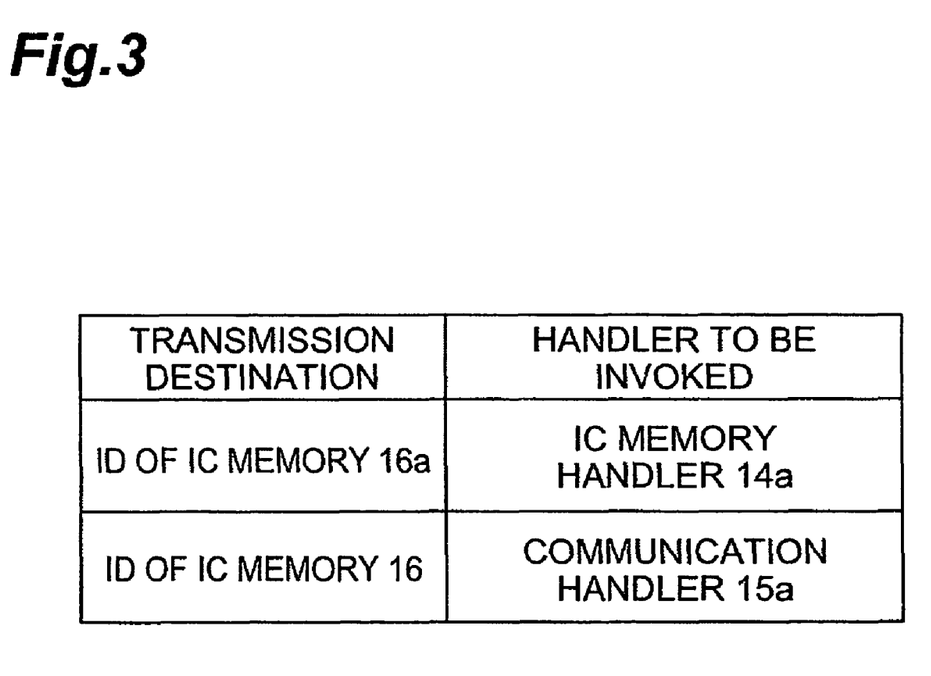
FIG. 3 is an illustration showing a specific example of a management table 17a in the present invention.

Other components are the same as those of the data processing apparatus 100. Incidentally, contents to be stored in the handler management table 17a are different from those described in the handler management table 17. FIG. 3 shows a specific example thereof. As show in the figure, a handler invoking the IC memory 16a in the data processing apparatus 100a and the communication handler 15 of the data processing apparatus 100 are stored being associating with each other so that they can be invoked according to a destination written in a message.

Figure 4:
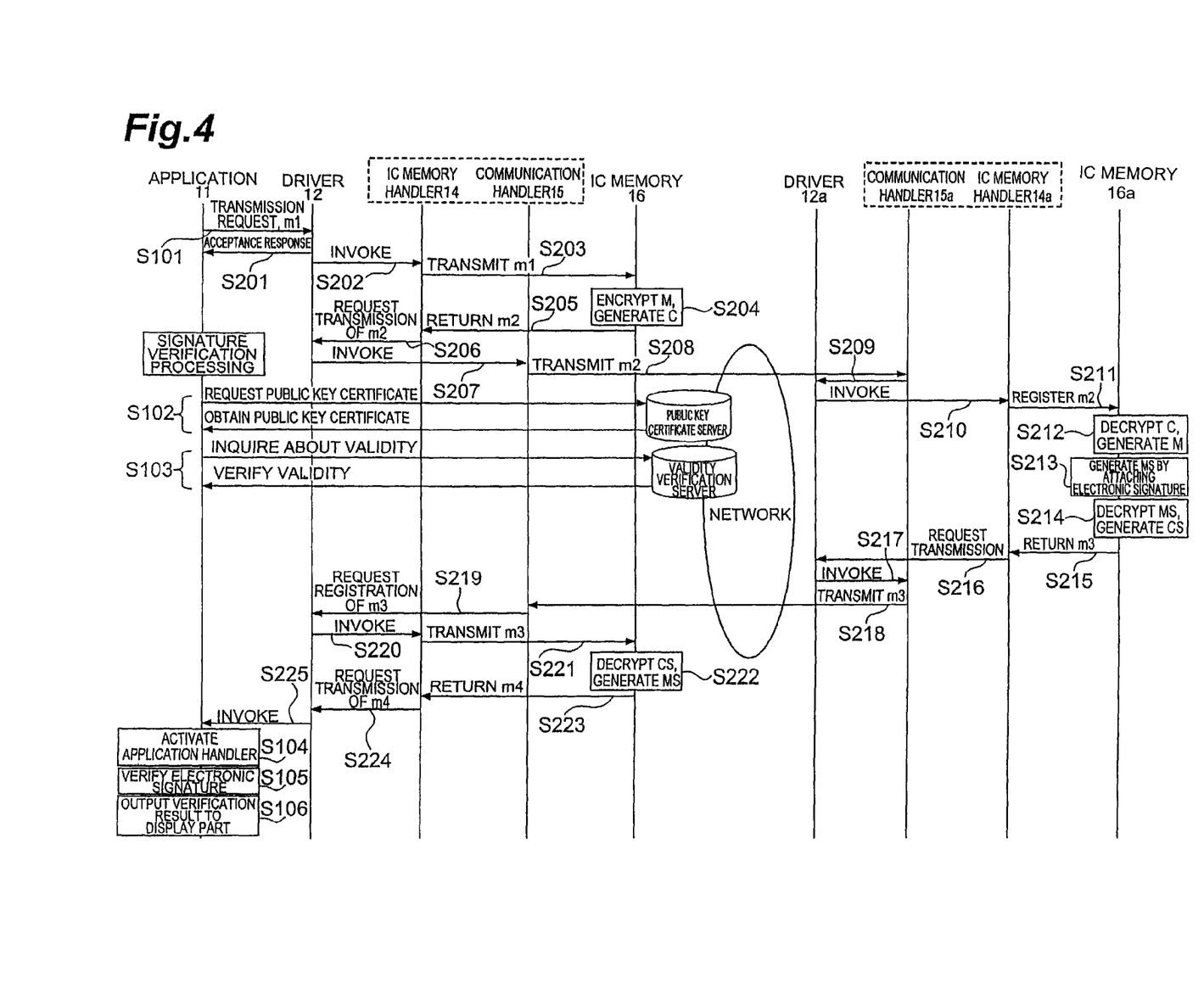
FIG. 4 is a sequence diagram of signal processing using the data processing apparatuses 100 and 100a in the present invention.

A specific example when an electronic signature is carried out between the data processing apparatuses 100 and 100a thus configured and the electronic signature is verified will be described. FIG. 4 is a sequence diagram when performing processing therefor.

The application 11 accepts an ID of the IC memory 16 that performs encryption processing, an ID of the IC memory 16a that attaches an electronic signature, and data attached with an electronic signature by user operations, makes a request to the data processing apparatus 100a, which is a destination of the accepted IC memory 16, to attach an electronic signature, and outputs a message m1<ID of the application 11, ID of the IC memory 16, ID of the IC memory 16a, and data M> to the driver 12 (S101). The application 11 receives a response to the request to attach an electronic signature from the driver 12, and then starts verification processing of the electronic signature. First, the application 11 transmits a request message to request a public key certificate, which is a certificate of a public key of the IC memory 16a, to a public key certificate server to obtain a public key certificate from the public key certificate server (S102). Incidentally, a public key certificate is to certify an association between a user and a public key under the responsibility of CA (Certificate Authority) in which an electronic signature of the CA itself is attached to background information of the user (full name, section, e-mail address, and the like) and public key data.

Further, the application 11 transmits an inquiry message to a validity verification server to perform processing to make an inquiry about validity of the obtained public key certificate, and after the validity verification server verifies whether or not the public key certificate is valid, the application 11 obtains a result thereof (S103). Incidentally, the authorities for managing whether or not a public key certificate is valid is also in charge of management and operation of the validity verification server and tries to return a management result in response to an inquiry about validity.

While the application 11 performs processing described above, the driver 12, the IC memory handler 14, and the communication handler 15 perform processing below:

The driver 12 returns a response of acceptance of the transmission request to the application 11 (S201) and invokes a handler corresponding to a destination written in a message received from the application 11 (S202). Since here an ID of the IC memory 16 is written, the corresponding IC memory handler 14 is invoked based on the handler management table 17.

The invoked IC memory handler 14 outputs the message m1 to the IC memory 16 (S203). The IC memory 16 that received the message m1 retrieves data M from the message m1 and encrypts the data M using a predetermined public key Pk2 to generate encrypted data C (S204). Then, the IC memory 16 generates a message m2<ID of the IC memory 16, ID of the IC memory 16a, and C> whose transmission source is the ID of the IC memory 16 and whose transmission destination is the ID of the IC memory 16a written in a data content field of the message m1 and outputs the message m2 to the IC memory handler 14 (S205).

The IC memory handler 14 analyzes the message m2 and requests the driver 12 to transmit the encrypted data C to a destination indicated by the ID of the IC memory 16a (S206). The driver 12 invokes the communication handler 15 corresponding to the destination written in the message m2 based on the handler management table 17 (S207). An IP address of the destination is already set to the invoked communication handler 15 in advance and, when invoked, the communication handler 15 connects to the data processing apparatus 100a having the communication handler 15a specified by the set IP address for communication and transmits the message m2 to the ID specifying the IC memory 16a described in the message m2 (S208). Besides, the corresponding IP address may be retrieved by placing a server in which the ID of the IC memory 16a and an IP address of an apparatus having the IC memory 16a are stored by associating with each other and transmitting the ID of the IC memory 16a to the server without setting any IP address to the communication handler 15a in advance.

The communication handler 15a transmits the message m2 to the driver 12a (S209). The driver 12a that received the message m2 invokes the IC memory handler 14 corresponding to the destination written in the message m2 based on the handler management table 17a (S210). The invoked IC memory handler 14a registers the message m2 in the IC memory 16a (S211).

The IC memory 16a in which the message m2 is registered decrypts the encrypted data C written in the message m2 using a secret key Sk2 to obtain the data M (S212). Then, the IC memory 16a generates electronically signed data MS by attaching an electronic signature to the data M (S213) and encrypts the MS using the public key Pk1 to generate encrypted data CS (S214).

The IC memory 16a generates a message m3<ID of the IC memory 16a, ID of the IC memory 16, CS> having the encrypted data CS that is data for returning the encrypted data CS using the transmission source and transmission destination written in the message m2 and returns the message m3 to the IC memory handler 14a (S215). The IC memory handler 14a requests the driver 12a to transmit the message m3 (S216) and the driver 12a invokes the communication handler 15a corresponding to the destination of the message m3 based on the handler management table 17a (S217).

An IP address of the destination is already set to the invoked communication handler 15a in advance and, when invoked, the communication handler 15a connects to the communication handler 15 specified by the set IP address for communication and transmits the message m3 to the ID specifying the IC memory 16 (S218). Besides, the corresponding IP address may be retrieved by placing a server in which the ID of the IC memory 16 and an IP address of an apparatus having the IC memory 16 are stored by associating with each other and transmitting the ID of the IC memory 16 to the server without setting any IP address to the communication handler 15a in advance.

The communication handler 15 that received transmission processing from the communication handler 15a outputs the message m3 to the driver 12 so that it is registered (S219). The driver 12 invokes the IC memory handler 14 corresponding to the destination written in the message m3 based on the handler management table 17 (S220).

The invoked IC memory handler 14 transmits the message m3 to the destination specified by the ID of the IC memory 16 written in the message m3, that is, to the IC memory 16 (S221). The IC memory 16 decrypts the encrypted data CS in the transmitted message m3 using a secret key Sk1 to obtain the electronically signed data MS (S222). Then, since the IC memory 16 has the transmission source (that is, the ID of the application 11) written in the message m1 received in S203 stored in it, the IC memory 16 generates a message m4<ID of the IC memory 16, ID of the application 11, MS> having the electronically signed data MS using the stored transmission source and returns the message m4 to the IC memory handler 14 so that the message m4 can be delivered to the application 11 (S223). The IC memory handler 14 further transmits the message m4 to the driver 12 (S224).

The driver 12 invokes the application handler 13 corresponding to the ID of the application 11, which is the destination written in the message m4, based on the handler management table 17 (S225).

The invoked application handler 13 interrupts processing of the application 11 for activation (S104). Then, the activated application handler 13 verifies whether or not the electronic signature of the data MS in the message m4 is valid. That is, whether or not the public key that provided an electronic signature to the MS and the public key described in the above-described public key certificate judged to be valid match is judged and, if they match, it is judged that the electronic signature attached to the data MS written in the message m4 is valid and, if they do not match, it is judged that the electronic signature is invalid (S105). Then, a judgment result thereof is output to the display part (S106). Incidentally, it is assumed that, before the invoking processing of the application handler 13 is performed in S225, a request of a public key certificate and validity verification in S102 and S103 respectively have been completed.

With the above processing, an electronic signature is attached to data to be transmitted and validity of the electronic signature is verified, and then the user can perform transmission processing of data attached with a validated electronic signature to any destination.

As mentioned above, an effect obtained by making a transmission request from the application 11 to the driver 12 and returning an acceptance response to the transmission request from the driver 12 to the application 11 will be described.

By making a transmission request to the driver 12 and receiving a response of acceptance thereof from the driver 12, there is no need for the application 11 to wait until a processing result in response to the transmission request arrives from the driver 12 and the application 11 can perform other processing to achieve efficient processing.

Next, another embodiment using a shared memory instead of a driver will be described.

Figure 5:
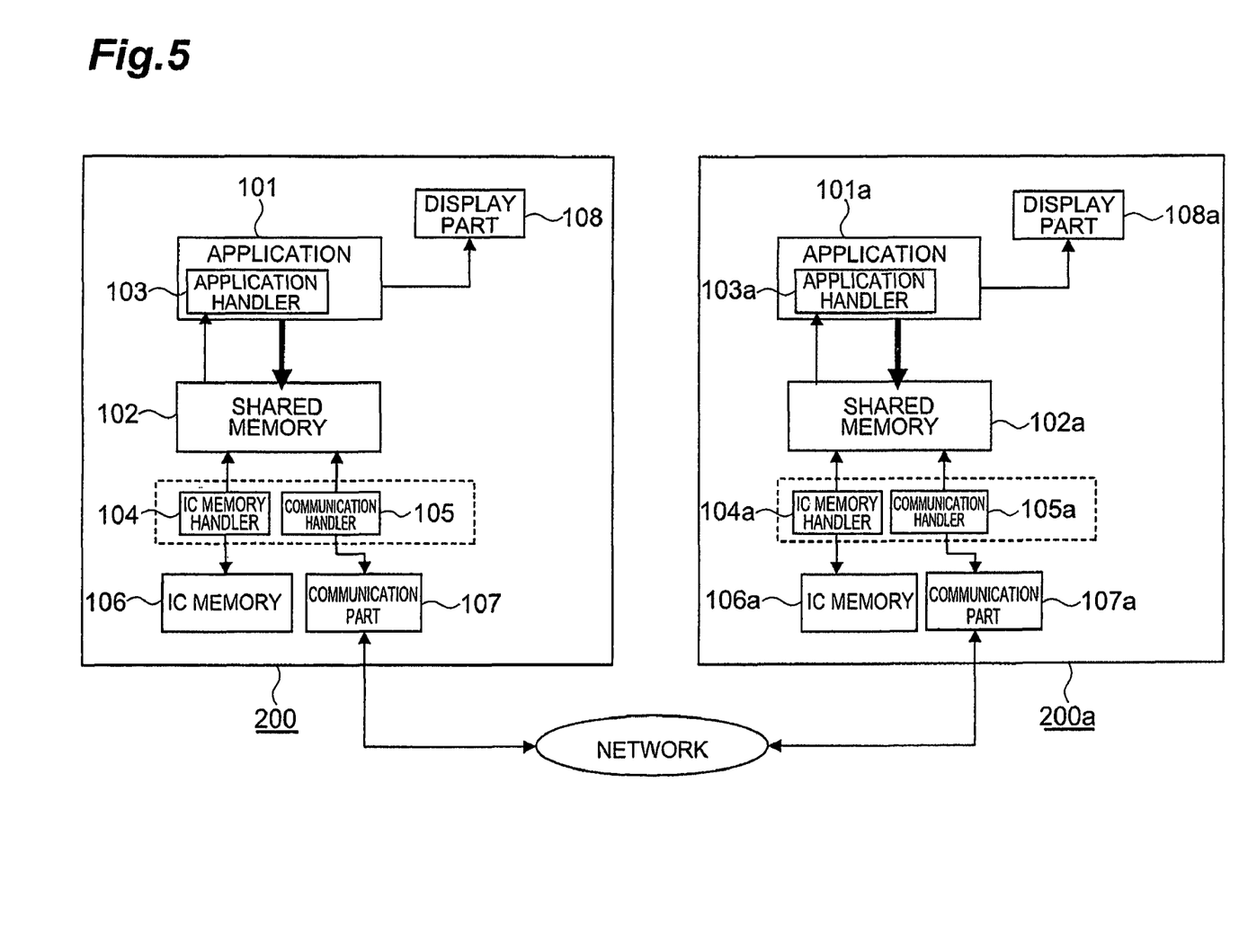
FIG. 5 is a block diagram of data processing apparatuses 200 and 200a in another embodiment of the present invention.

FIG. 5 is a block diagram of the data processing apparatus 200, which is another embodiment.

A data processing apparatus 200 according to the present invention is comprised of an application 101 (application of the present invention) (holding an application handler 103 (handler means of the present invention) therein), a shared memory 102 (shared memory of the present invention), an IC memory handler 104 (handler means of the present invention), a communication handler 105 (handler means of the present invention), an IC memory 106, a communication part 107, and a display part 108. Similarly, a data processing apparatus 200a, which is a communication partner of the present invention, is comprised of an application 101a (holding the application handler 13a inside), a shared memory 102a, an IC memory handler 104a, a communication handler 105a, an IC memory 106a, a communication part 107a, and a display part 108a.

The application 101 is activated and operated inside the data processing apparatus 200 to perform predetermined processing. In the present example, the application 101 is an application that can verify an electronic signature and has functions to make a transmission request of a message to which an electronic signature is attached, and along with the request, to demand a public key certificate from a public key authentication server and make an inquiry at a validity verification server about validity of a public key to verify the requested electronic signature based on the above processed information.

The application handler 103 is a handler held inside the application and this handler always monitors the shared memory 102. When a message with an ID specifying the application as a destination is registered in the shared memory, the application handler 103 performs interrupt processing. In the present invention, verification processing of an electronic signature is performed. A handler in the present embodiment refers to an interrupt handling routine activated by an external interrupt, always monitors the shared memory 102 and, if a predetermined condition is satisfied (for example, a predetermined destination is set to a message), a handler satisfying the condition performs interrupt processing for operation.

The IC memory handler 104 is a handler for accessing the IC memory 106 and this handler always monitors the shared memory 102. When a message satisfying a specific condition is registered in the shared memory 102, the IC memory handler 104 performs interrupt processing for accessing the IC memory 106. When a write operation is performed to the shared memory 102, the IC memory handler 104 returns, immediately after performing the write operation, to processing to perform a monitoring operation of the shared memory 102. In the present invention, if a message writing an ID that specifies the IC memory 105 as a destination is registered in the shared memory 102, the IC memory handler 104 performs an operation to obtain the message and outputs the obtained message to the IC memory 106. Then, the IC memory handler 104 outputs the message to the IC memory 105 to cause the IC memory 105 to perform encryption processing or decryption processing of the message. When data for which encryption processing or decryption processing has been performed is received from the IC memory 105, the IC memory handler 104 performs write processing of the data to the shared memory 102.

The communication handler 105 is a handler for performing communication processing and this handler always monitors the shared memory 102. When a message satisfying a specific condition is registered in the shared memory, the communication handler 105 performs interrupt processing for communication. In the present invention, if a message registered in the shared memory 102 describes an ID of each device incorporated in the data processing apparatus 200a as a destination, the communication handler 105 retrieves an IP address corresponding to an ID written in the message as a transmission destination from separately stored memory and transmits the message to the extracted IP address. The communication handler 105 has memory in which an ID described as a transmission destination and an IP address as a physical destination are stored by associating with each other, and retrieves an IP address corresponding to an ID written as a destination of a registered message to perform, together with the ID written as a destination of the message to the relevant IP address, transmission processing of transmission data. Also, when a message received from the data processing apparatus 200a is received, the communication handler 105 performs write processing of the received message into the shared memory 102.

The IC memory 106 is a memory composed of non-volatile memory, and is detachably mounted and mainly used for encryption processing and decryption processing.

The communication part 107 conducts communication with a partner via a network.

The display part 108 displays a result of verifying an electronic signature signed with the data processing apparatus 200a.

Next, the configuration of the data processing apparatus 200a will be described. The data processing apparatus 200a is an apparatus for receiving a request of electronic signature from the data processing apparatus 200.

The IC memory 106a decrypts a message transmitted from the data processing apparatus 200 and attaches an electronic signature to the decrypted message. Then, the IC memory 106a encodes the message attached with the electronic signature and transmits the message to the IC memory driver 104.

Other components are the same as those of the data processing apparatus 200.

Figure 6:
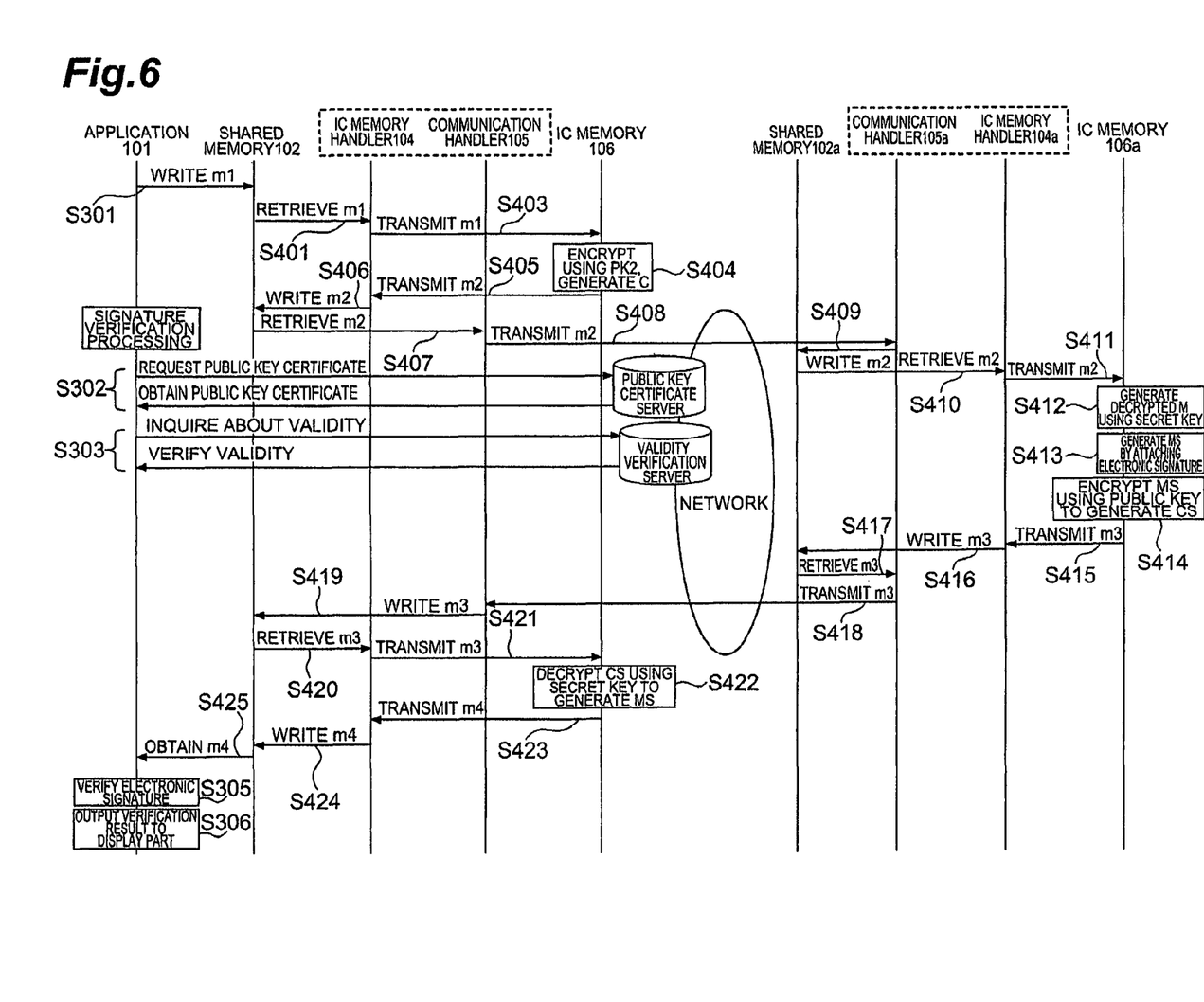
FIG. 6 is a sequence diagram of signal processing using the data processing apparatuses 200 and 200a in the present invention.

A specific example when an electronic signature is carried out between the data processing apparatuses 200 and 200a thus configured and the electronic signature is verified will be described. FIG. 6 is a sequence diagram when performing processing therefor.

To make a request of attachment of an electronic signature to data, the application 101 accepts input of an ID of the IC memory 106 and an ID of the IC memory 106a from a user, generates the message m1<ID of the application 101, ID of the IC memory 106, ID of the IC memory 106a, and data M> using the accepted IDs of the IC memory 106 and the IC memory 106a, and writes the message m1 into the shared memory 102 (S301).

After registering a request of attachment of an electronic signature in the shared memory 102, the application 101 starts signature verification processing. First, the application 11 transmits a request message to request a public key certificate, which is a certificate of a public key of the IC memory 16a, to a public key certificate server to obtain a public key certificate from the public key certificate server (S102). A public key certificate is to certify an association between a user and a public key under the responsibility of CA (Certificate Authority) in which an electronic signature of the CA itself is attached to background information of the user (full name, section, e-mail address, and the like) and public key data.

The application 11 also transmits an inquiry message to a validity verification server to perform processing of making an inquiry about validity of the obtained public key certificate, and after the validity verification server verifies whether or not the public key certificate is valid, the application 101 obtains a result thereof (S103). Incidentally, the authorities for managing whether a public key certificate is valid is also in charge of management and operation of the validity verification server and tries to return management results in response to an inquiry about validity.

While the application 101 performs processing described above, the IC memory handler 104 and the communication handler 105 perform processing shown below:

When the message m1 in which the ID of the IC memory 106 as a destination is described is written into the shared memory 102, the IC memory handler 104 detects that the message m1 including the ID of the IC memory 106 as a destination has been registered, retrieves the message m1 (S401), and outputs the message to the IC memory 106 (S403). The IC memory 106 encrypts the data M included in the message m1 using the public key Pk2 provided in advance to generate data C (S404). Then, the IC memory 106 generates a message m2<ID of the IC memory 106, ID of the IC memory 106a, and C> whose transmission source is the ID of the IC memory 106 and whose transmission destination is the ID of the IC memory 106a and returns the message m2 to the IC memory handler 104 (S405).

The IC memory handler 104 writes the message m2 into the shared memory 102 (S406). When the communication handler 105 detects that the message m2 in which the ID of the IC memory 106a is described as a destination has been registered in the shared memory 102, the communication handler 105 retrieves the message m2 (S407). An IP address of a destination is set to the communication handler 105 in advance and, when interrupt processing is performed, the communication handler 105 connects to the data processing apparatus 200a having the communication handler 105a specified by the set IP address for communication and transmits the retrieved message m2 to the ID specifying the IC memory 106a (S408). Besides, the corresponding IP address may be retrieved by placing a server in which the ID of the IC memory 106a and an IP address of an apparatus having the IC memory 106a are stored by associating with each other and transmitting the ID of the IC memory 106a to the server without setting any IP address to the communication handler 15a in advance.

Next, the communication handler 105a of the data processing apparatus 200a writes the received message m2 into the shared memory 102 (S409). The IC memory handler 104a always monitors the shared memory 102a and, when it detects that the message m2 in which the ID of the IC memory 106a is described as a transmission destination has been registered in the shared memory 102, the IC memory handler 104 retrieves the message m2 (S410) and transmits the message to the IC memory 106a (S411).

The IC memory 106a decrypts the encrypted data C included in the message m2 using the secret key Sk2 to obtain the data M (S412) and generates electronically signed data MS by attaching an electronic signature to the data M (S413). Then, the IC memory 106a encrypts the electronically signed data MS using the public key Pk1 to generate encrypted data CS (S414).

The IC memory 106a generates a message m3<ID of the IC memory 106a, ID of the IC memory 106, CS> having the encrypted data CS that is data for returning the encrypted data CS using the transmission source and transmission destination written in the message m2 and returns the message m3 to the IC memory handler 104a (S415). The IC memory handler 104a then writes the message m3 into the shared memory 102a (S416). When the communication handler 105a detects that the message m2 in which the ID of the IC memory 106a is written as a destination has been registered in the shared memory 102, the IC memory handler 105a retrieves the message m2 (S417).

An IP address of a destination is set to the communication handler 105a in advance and, when interrupt processing is performed, the communication handler 105a connects to the data processing apparatus 200a having the communication handler 105 specified by the set IP address for communication and transmits the retrieved message m3 to the ID specifying the IC memory 106 (S418). Besides, the corresponding IP address may be retrieved by placing a server in which the ID of the IC memory 106 and an IP address of an apparatus having the IC memory 106 are stored by associating with each other and transmitting the ID of the IC memory 106 to the server without setting any IP address to the communication handler 105a in advance.

When the communication handler 105 receives the message m3, the communication handler 105 writes the message m3 into the shared memory 102 (S419).

When the IC memory handler 104 detects the message m3 in which the ID of the IC memory 106 is described as a destination in the shared memory 102, the IC memory handler 104 retrieves the message m3 (S420) and transmits the message m3 to the IC memory 106 (S421). The IC memory 16 decrypts the encrypted data CS in the received message m3 using the secret key Sk1 to obtain electronically signed data MS (S422). Then, since the IC memory 106 has the transmission source (that is, the ID of the application 101) written in the message m1 received in S403 stored in it, the IC memory 16 generates a message m4<ID of the IC memory 16, ID of the application 11, MS> having the electronically signed data MS using the stored transmission source and returns the message m4 to the IC memory handler 14 so that the message m4 can be delivered to the application 101 (S423).

The IC memory handler 104 writes the message m4 into the shared memory 102 (S424). When the application handler 103 detects that the message m4 in which the ID of the application is described as a destination has been registered in the shared memory 102, the application handler 103 obtains the message m4 and causes an interrupt in processing of the application 101 to verify whether or not the electronic signature of the electronically signed data MS of the obtained message m4 is valid.

That is, whether or not the public key that is provided an electronic signature to the MS and the public key described in the public key certificate judged to be valid above match is judged and, if they match, it is judged that the electronic signature attached to the data MS written in the message m4 is valid and, if they do not match, it is judged that the electronic signature is invalid (S304). Then, a judgment result thereof is output to the display part (S305). Incidentally, it is assumed that, before invocating processing of the application handler 13 is performed in S425, a request of a public key certificate and validity verification in S302 and S303 respectively have been completed.

With the above processing, an electronic signature is attached to data to be transmitted and validity of the electronic signature is verified, and then the user can perform transmission processing of data to which a validated electronic signature is attached to any destination.

As mentioned above, an effect obtained by registering a message in the shared memory 102 from the application 101 and performing interrupt processing freely by each handler monitoring the shared memory will be described.

If the application 101 registers a message in the shared memory 102 and, after the registration, performs other processing, and each handler performs interrupt processing appropriately in accordance with each message registered in the shared memory, there is no need for the application 101 to wait until a processing result of the message registered in the shared memory is received and the application 101 can perform other processing to achieve efficient processing.

The invention claimed is:

1. A data processing method using a data processing apparatus on a transmitting side having an application for performing processing using an internal device installed in the data processing apparatus, a driver means for accepting an access request to the internal device from the application, a handler means which includes a memory handler and a communication handler, for performing access processing to the internal device and transmitting a second message to an external device installed outside the data processing apparatus, and a storage means for storing a device identifier (ID) as a transmission destination for specifying the internal or external device in association with the handler means, and a data processing apparatus on a receiving side for receiving the second message transmitted from the data processing apparatus on the transmitting side, the data processing method comprising:

a requesting step in which the application generates a first message having a device ID accepted from a user and data, and makes an access request to the internal device as well as makes a transmission request of the first message generated by the application, to the driver means, the first message being a request from the application to receive first information from the data processing apparatus on the receiving side, the first information being information that requires verification after it is received by the data processing apparatus on the transmitting side;

an invoking step in which the driver means specifies and invokes the memory handler of the handler means for performing access processing to the internal device based on information stored in the storage means;

a responding step in which the driver means responds to the access request of the application;

a selecting step in which the driver means selects a handler means from among a plurality of handler means corresponding to the device ID based on information stored in the storage means if the driver means obtains the second message having the device ID and data which is processed in the internal device and is to be transmitted from the invoked memory handler of the handler means as a result of accessing to the internal device;

a transmitting step in which the communication handler of the handler means selected in the selecting step transmits the second message to the data processing apparatus on the receiving side which is the destination associated with the device ID retrieved from the storage means storing the device ID and destination in association with each other;

a transferring step in which the data processing apparatus on the receiving side transfers the received second message to a device specified by the device ID described in the received second message;

a receiving step of receiving the first information from the data processing apparatus on the receiving side; and a verifying step of verifying the first information by comparing the first information with second information received from an external server device;

wherein when the application receives a response of acceptance of the transmission request of the first message, the application performs predetermined processing before receiving the first information from the data processing apparatus on the receiving side in response to the transmission request, such that the predetermined processing is performed while at least the invoking step, the responding step, the selecting step, and the transmitting step are being performed, the predetermined processing including requesting and obtaining the second information from the external server device.

2. The data processing method according to claim 1, wherein the internal device is an IC memory of the transmitting side data processing apparatus and the external device is an IC memory of the receiving side data processing apparatus.

3. The data processing method according to claim 1, wherein the handler means transmits the first message to the internal device and the internal device encrypts the first message to generate the second message.

4. The data processing method according to claim 1, wherein the external server device is at least one of a public key certificate server and a validity verification server, and the predetermined processing is electronic signature verification processing which includes transmitting a request message to request a public key certificate, which is a certificate of a public key of the internal device, to the public key certificate server to obtain a public key certificate from the public key certificate server, and transmitting an inquiry message to the validity verification server to make an inquiry about validity of the obtained public key certificate, and receiving verification from the validity verification server on whether or not the public key certificate is valid.

5. A data processing apparatus on a transmitting side of a network, comprising:
an internal device;
an application configured to perform processing using the internal device;
a driver means for accepting an access request to the internal device from the application;
a handler means, which includes a memory handler and a communication handler, for performing access processing to the internal device and transmitting a second message to an external device installed in a data processing apparatus on a receiving side outside the data processing apparatus; and a storage means for storing a device identifier (ID) as a transmission destination for specifying the internal or external device in association with the handler means and the data processing apparatus on the receiving side for receiving the second message transmitted from the data processing apparatus on the transmitting side, wherein the application generates a first message having a device ID accepted from a user and data, and makes an access request to the internal device as well as makes a transmission request of the first message generated by the application, to the driver means, the first message being a request from the application to receive first information from the data processing apparatus on the receiving side, the first information being information that requires verification after it is received by the data processing apparatus on the transmitting side, the driver means specifies and invokes the memory handler of the handler means for performing access processing to the internal device based on information stored in the storage means, the driver means responds to the access request of the application and selects a handler means from among a plurality of handler means corresponding to the device ID based on information stored in the storage means if the driver means obtains the second message having the device ID and data which is processed in the internal device and is to be transmitted from the invoked memory handler of the handler means as a result of accessing to the internal device, the communication handler of the handler means, selected by the driver means, transmits the second message to the data processing apparatus on the receiving side which is the destination associated with the device ID retrieved from the storage means storing the device ID and destination in association with each other, wherein the data processing apparatus on the receiving side transfers the received second message to a device specified by the device ID described in the received second message, the application receives the first information from the data processing apparatus on the receiving side and verifies the first information by comparing the first information with second information received from an external server device, and wherein when the application receives a response of acceptance of the transmission request of the first message, the application performs predetermined processing before receiving the first information from the data processing apparatus on the receiving side in response to the transmission request, such that the application performs the predetermined processing while at least the driver means specifies and invokes the memory handler of the handler means, the driver means responds to the access request of the application and selects a handler means from among a plurality of handler means, and the communication handler of the handler means transmits the second message to the data processing apparatus on the receiving side, the predetermined processing including requesting and obtaining the second information from the external server device.

* * * * *

UNITED STATES PATENT AND TRADEMARK OFFICE
CERTIFICATE OF CORRECTION

PATENT NO. : 8,161,499 B2
APPLICATION NO. : 11/587096
DATED : April 17, 2012
INVENTOR(S) : Ken Sakamura et al.

It is certified that error appears in the above-identified patent and that said Letters Patent is hereby corrected as shown below:

On the title page: Item (73) should read:

-- (73)     Assignees: NTT DoCoMo, Inc., Tokyo (JP); Ken Sakamura, Tokyo (JP); Noboru Koshizuka, Musashino-shi (JP) --

Signed and Sealed this
Twelfth Day of June, 2012

David J. Kappos
*Director of the United States Patent and Trademark Office*